(12) United States Patent
Miwa et al.

(10) Patent No.: US 9,956,641 B2
(45) Date of Patent: May 1, 2018

(54) PROTECTIVE COVER FOR WELDING GUN

(71) Applicant: HONDA MOTOR CO., LTD., Tokyo (JP)

(72) Inventors: Hiroshi Miwa, Tochigi (JP); Yohei Teragaito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 15/021,173

(22) PCT Filed: Sep. 18, 2014

(86) PCT No.: PCT/JP2014/074682
§ 371 (c)(1),
(2) Date: Mar. 10, 2016

(87) PCT Pub. No.: WO2015/041287
PCT Pub. Date: Mar. 26, 2015

(65) Prior Publication Data
US 2016/0221113 A1   Aug. 4, 2016

(30) Foreign Application Priority Data

Sep. 20, 2013 (JP) ................................ 2013-194910

(51) Int. Cl.
*B23K 11/36* (2006.01)
*B23K 11/11* (2006.01)
*B23K 11/31* (2006.01)

(52) U.S. Cl.
CPC ............ *B23K 11/36* (2013.01); *B23K 11/115* (2013.01); *B23K 11/314* (2013.01)

(58) Field of Classification Search
CPC ...... B23K 11/115; B23K 11/314; B23K 11/36
See application file for complete search history.

(56) References Cited

U.S. PATENT DOCUMENTS 2,434,025 A    1/1948  Wallace
4,111,380 A *  9/1978  Heuckroth ............. B65H 49/02
                                                 242/128

(Continued)

FOREIGN PATENT DOCUMENTS

CN    201291354 Y    8/2009
JP    11-245051      9/1999

(Continued)

OTHER PUBLICATIONS

Machine translation of Japan Patent document No. 3,141,165-U, Sep. 2017.*

(Continued)

*Primary Examiner* — Geoffrey S Evans
(74) *Attorney, Agent, or Firm* — Rankin, Hill & Clark LLP

(57) ABSTRACT

A protective cover used in a guide groove-type welding gun is provided with: a cover body into which a movable gun arm is inserted, said cover body being of a flame-retardant fabric, covering at least a gun body, having an open-ended tubular shape, and being capable of following changes in shape; the first strings that can allow the mobile gun arm to project and maintain the upper end opening in a narrow-mouthed state; and the second string that can allow the fixed gun arm to project and maintain the lower end opening in a narrow-mouthed state. Thus, sputter depositions and the like that occur during welding are reliably prevented from penetrating the gun body, further improving the durability of the welding gun.

4 Claims, 5 Drawing Sheets

(56) References Cited

U.S. PATENT DOCUMENTS

| | | | | |
|---|---|---|---|---|
| 4,484,772 | A | * | 11/1984 | Ross, Sr. ................. F16L 27/11 |
| | | | | 285/226 |
| 4,660,610 | A | * | 4/1987 | McIntire, III .......... B23K 37/00 |
| | | | | 150/161 |
| 4,931,617 | A | * | 6/1990 | Toyoda .................. B23K 9/287 |
| | | | | 174/350 |
| 4,947,017 | A | * | 8/1990 | Beck .................... B23K 11/314 |
| | | | | 219/86.25 |
| 7,214,905 | B2 | * | 5/2007 | Brook ...................... B23K 9/32 |
| | | | | 219/130.1 |
| 7,271,362 | B2 | * | 9/2007 | Robillot ................. B23K 11/36 |
| | | | | 219/138 |
| 2008/0110866 | A1 | | 5/2008 | Chirivella et al. |
| 2012/0031887 | A1 | | 2/2012 | Matsumoto et al. |

FOREIGN PATENT DOCUMENTS

| | | | | |
|---|---|---|---|---|
| JP | 11-245051 | A | * | 9/1999 |
| JP | 3141165 | | | 4/2008 |
| JP | 3141165 | U | * | 4/2008 |
| JP | 2012-35274 | | | 2/2012 |
| JP | 2012-166248 | | | 9/2012 |
| JP | 2013-059806 | | | 4/2013 |
| WO | WO-2007/122717 | A | * | 11/2007 |

OTHER PUBLICATIONS

Machine translation of Japan Patent document No. 11-245,051, Sep. 2017.*

Chinese Office Action dated Jun. 30, 2017, English translation included, 9 pages.

International Search Report, dated: Dec. 22, 2014 (Dec. 22, 2014).

* cited by examiner

PROTECTIVE COVER FOR WELDING GUN

TECHNICAL FIELD

The present invention relates to a protective cover for a welding gun ideal for use in a guide groove-type welding gun.

BACKGROUND ART

As a welding gun equipped to a robot or the like, conventionally, the guide type of welding gun has been known that is configured so as to include a fixed gun arm fixed to a gun body, a mobile gun arm opposing the fixed gun arm, and a drive device equipped to the gun body side; connect the mobile gun arm to an arm holder that is movable along a guide groove formed in the gun body side; and cause the mobile gun arm to undergo an opening/closing operation via the arm holder by way of the drive device.

In such a welding gun, a work is sandwiched between the electrode tips at the leading ends of the fixed gun arm and mobile gun arm by closing the mobile gun arm, and there is a risk of welding slag flying from the spot point on the work then passing through a gap between both gun arms and penetrating into the gun body. In other words, the internal mechanisms of the gun body are fouled by welding slag, which becomes one of the main causes of the durability of the gun body declining.

For this reason, to date, a gun has been disclosed in Patent Document 1 that provides a sheet-like cover member, fixing one end of the cover member to a portion of the gun body positioned in a gap between the fixed gun arm and mobile gun arm in a closed state of the mobile gun arm, and fixing the other end of the cover member to an arm holder. According to this, the cover member is unfolded and folded accompanying the opening/closing operation of the mobile gun arm, and the incursion path of welding slag to the gun body is always shielded irrespective of the opening/closing of the mobile gun arm by the cover member.

Patent Document 1: Japanese Unexamined Patent Application, Publication No. H11-245051

DISCLOSURE OF THE INVENTION

Problems to be Solved by the Invention

However, with the cover member disclosed in Patent Document 1, it is only possible to guard a part of the welding slag flying towards the gun body from the contact positions of the electrodes and work, and depending on the flight path of the welding slag, it may not protect from penetration to the gun body.

In other words, there is equipment configured by equipping a plurality of welding guns to one robot or the like. In this case, in a situation where one welding gun is mobile, and another welding gun opens the mobile gun arm and then rests, the flight path of welding slag flying from the operating welding gun will differ from the flight path that is prevented by the cover member of the resting welding gun; therefore, welding slag will intrude inside of the gun body.

The present invention has an object of providing a protective cover for welding guns that can reliably prevent welding slag, etc. generated during welding from penetrating into the gun body, and even further improves the durability of welding guns.

Means for Solving the Problems

A first aspect of the present invention is characterized by a protective cover for use on a welding gun which includes a fixed gun arm that is fixed to a gun body, a mobile gun arm opposing the fixed gun arm, and a drive device provided at a side of the gun body, in which the mobile gun arm is connected to an arm holder that is movable along a guide groove formed in a side of the gun body, and the mobile gun arm undergoes opening/closing operations via the arm holder by way of the drive device, the protective cover including: a protecting means of a flame retardant fabric capable of following shape changes and having an open-ended tubular shape into which the mobile gun arm or the fixed gun arm is inserted, and at least covering the gun body; a mobile gun arm retaining means that can allow the mobile gun arm to project and maintain one end opening of the protecting means in an narrow-mouthed state; and a fixed gun arm retaining means that can allow the fixed gun arm to project and maintain one other end opening of the protecting means in a narrow-mouthed state.

According to the first aspect of the invention, the gun body will be concealed by the protective cover having flexibility. The welding slag, etc. generated during welding is thereby prevented from penetrating inside the gun body regardless of the opening/closing state of the mobile gun arm, and the internal mechanism of the gun body can operate always keeping a clean state; therefore, the durability of the welding gun is improved.

According to a second aspect of the present invention, in the first aspect, it is preferable for a special section that can expand and contract to correspond to the opening/closing operations of the mobile gun arm to be provided in a portion of the protecting means positioned at least between the mobile gun arm and the fixed gun arm, which differs another portion of a common section.

According to the second aspect of the invention, it is possible to sufficiently handle the repeated opening/closing operations of the mobile gun arm, and the extend service life of the protective cover is achieved.

According to a third aspect of the present invention, in the first or second aspect, it is preferable for the protecting means to include: a first notched part that surrounds the fixed gun arm, and a second notched part that surrounds a pair of left and right side plates of the gun body.

According to the third aspect of the invention, the gun body is even further concealed without gaps by the protecting means, and penetrating of welding slag, etc. is more reliably prevented.

Effects of the Invention

According to the present invention, it is possible to provide a protective cover for welding guns that can reliably prevent welding slag, etc. generated during welding from penetrating into the gun body, and even further improves the durability of welding guns.

PREFERRED MODE FOR CARRYING OUT THE INVENTION

An embodiment of a protective cover for a welding gun according to the present invention will be explained in detail using the drawings.

Figure 1:
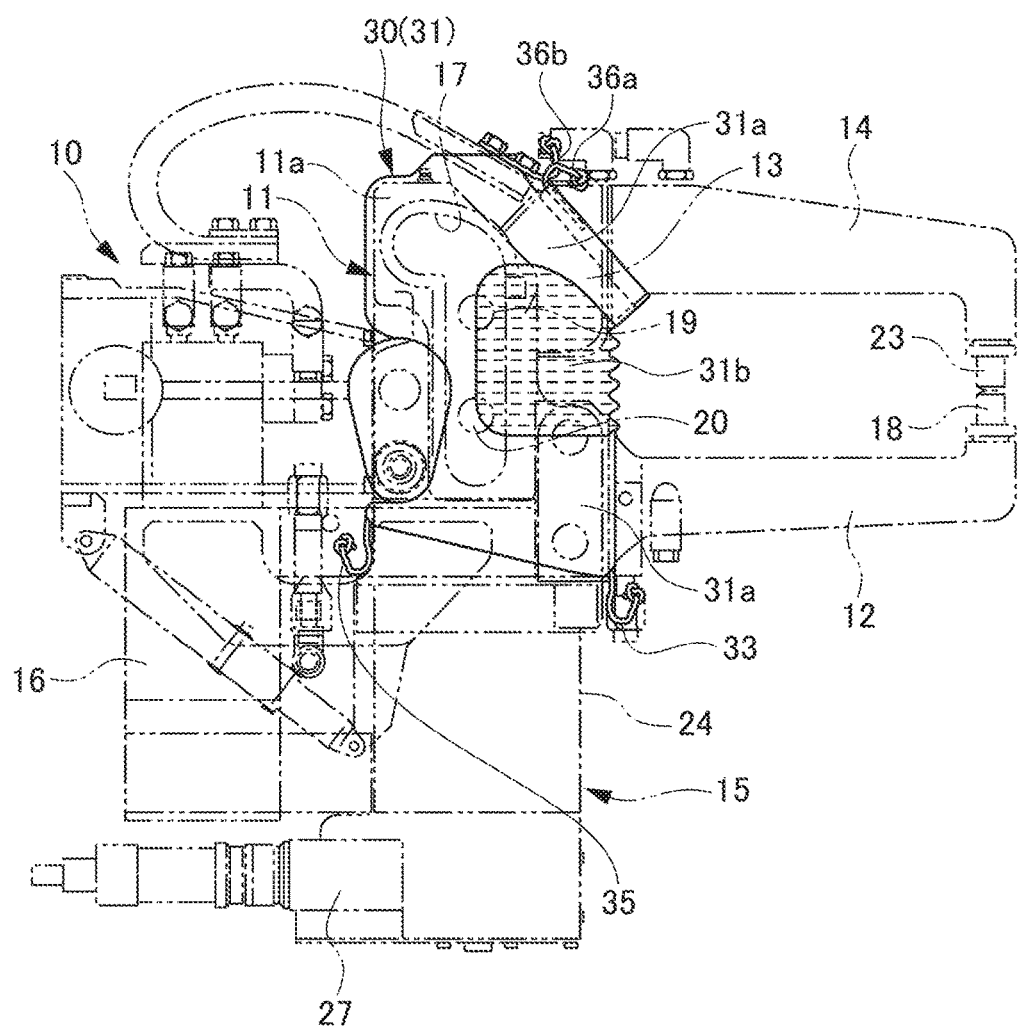
FIG. 1 is an overall side view of a welding gun equipped with a protective cover, illustrating an embodiment of the present invention.
Figure 2:
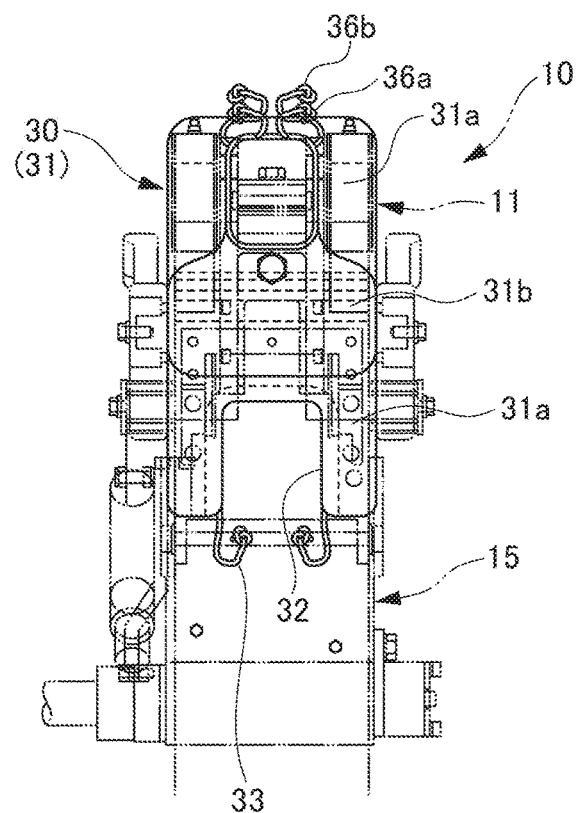
FIG. 2 is a front view of the welding gun of FIG. 1.
Figure 3:
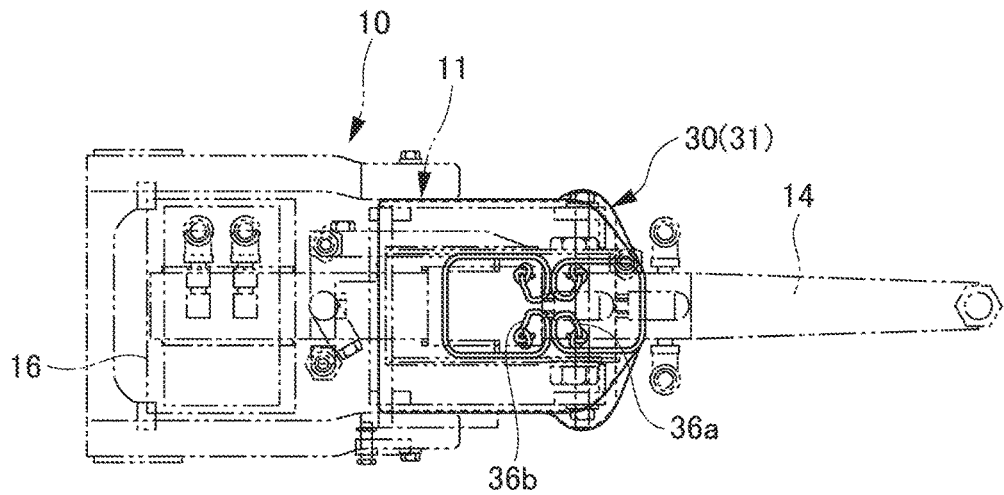
FIG. 3 is a plan view of the welding gun of FIG. 1.
Figure 4:
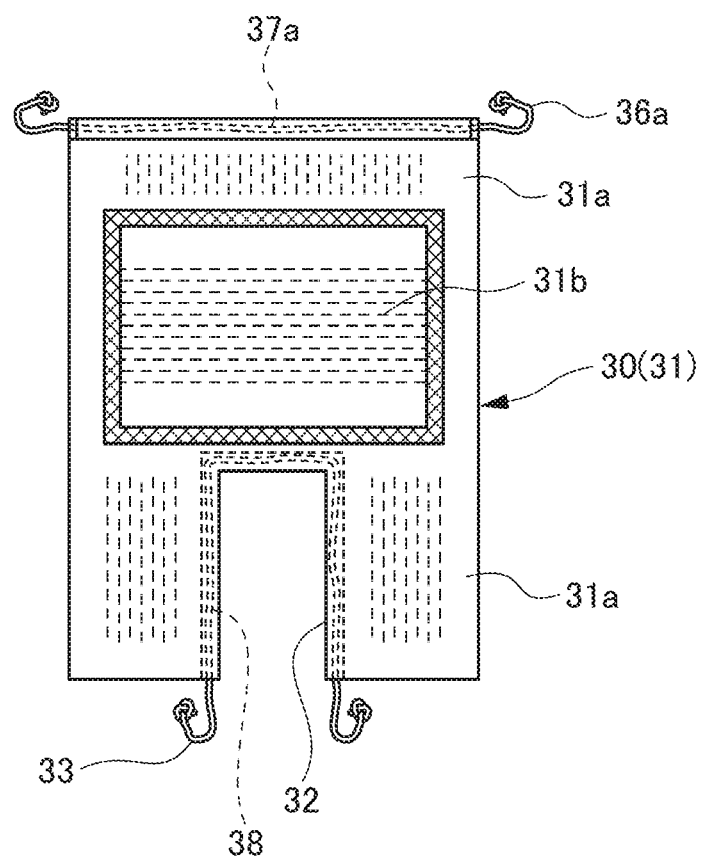
FIG. 4 is a front view when folding the protective cover alone.
Figure 5:
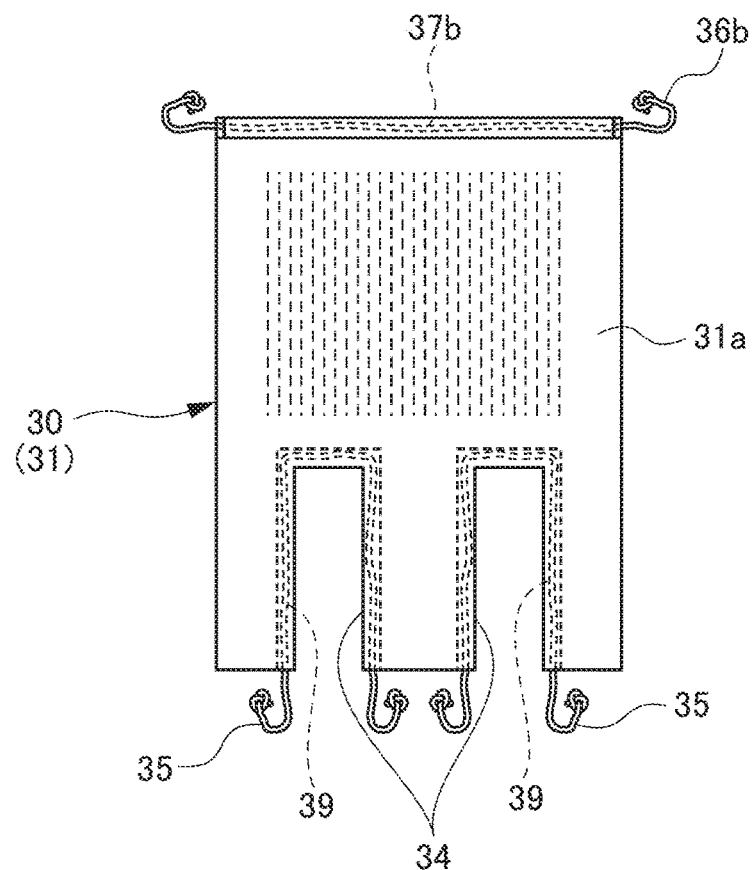
FIG. 5 is a rear view when folding the protective cover alone.
Figure 6:
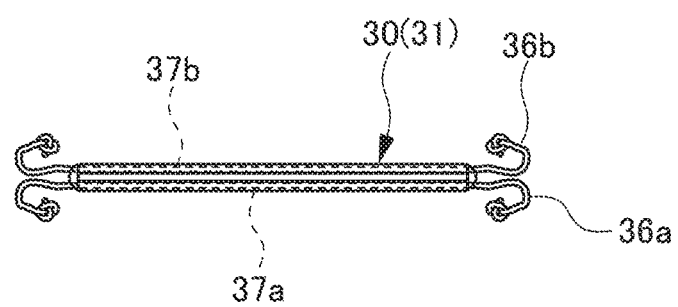
FIG. 6 is a plan view when folding the protective cover alone.
Figure 7:
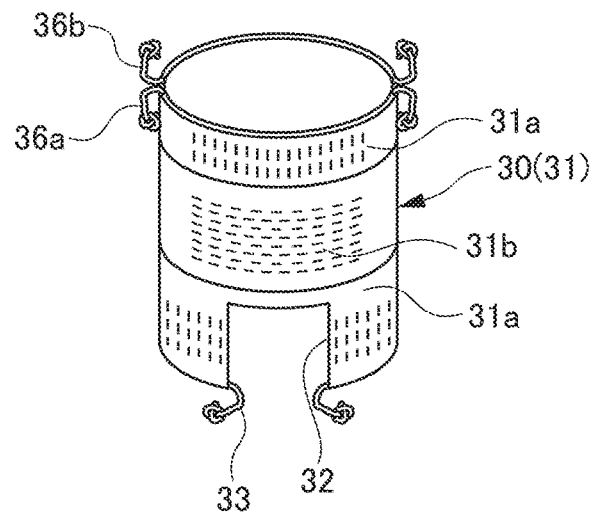
FIG. 7 is a perspective front view when spreading out the protective cover alone.
Figure 8:
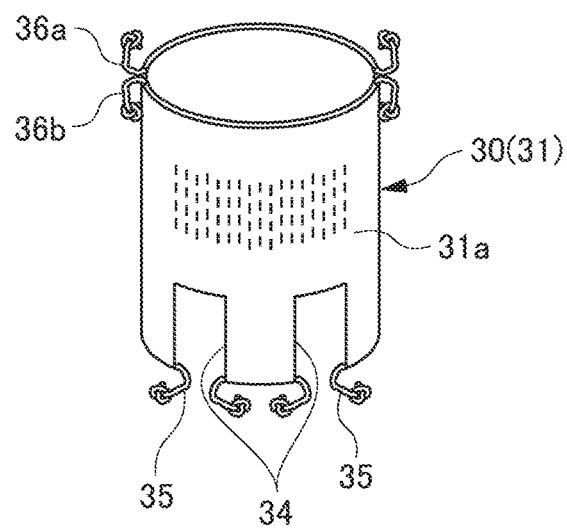
FIG. 8 is a perspective rear view when spreading out the protective cover alone.

FIG. 1 is an overall side view of a welding gun equipped with a protective cover, illustrating an embodiment of the present invention; FIG. 2 is a front view of the welding gun of FIG. 1; FIG. 3 is a plan view of the welding gun of FIG. 1; FIG. 4 is a front view when folding the protective cover unit; FIG. 5 is a rear view when folding the protective cover unit; FIG. 6 is a plan view when folding the protective cover unit; FIG. 7 is a perspective front view when unfolding the protective cover unit; and FIG. 8 is a perspective rear view when unfolding the protective cover unit.

As shown in FIGS. 1 to 3, this welding gun 10 is a guide groove-type welding gun, and further, is a so-called servo gun using a servo motor as the drive source.

The welding gun 10 includes a gun body 11, a fixed gun arm 12, an arm holder 13, a mobile gun arm 14, a motor drive unit (drive device) 15, and a transformer 16.

Guide grooves 17 of reverse J-shape extending in the vertical direction and having the upper end curved backwards are formed to face each other in one pair of left and right side plates 11a of the gun body 11.

The fixed gun arm 12 has a base end fixed to a lower part of the gun body 11, and extends from the gun body 11 forwards (right in FIG. 1). An electrode tip 18 is installed pointing up to the leading end of the fixed gun arm 12.

The arm holder 13 is arranged between the side plates 11a of the gun body 11. Upper and lower two guide pins 19, 20, each penetrating substantially horizontally, are installed in the arm holder 13.

Around the pins of both ends of the guide pins 19, 20, a roller follower (not illustrated) engaging with the guide groove 17 is installed.

For this reason, the arm holder 13 moves along the guide groove 17, by the roller followers of the upper and lower guide pins 19, 20 moving along the guide groove 17.

The mobile gun arm 14 has a base end fixed to the arm holder 13, and extends from the arm holder 13 forwards (right in FIG. 1). An electrode tip 23 is installed pointing downwards to the leading end of the mobile gun arm 14.

Accompanying the arm holder 13 moving along the guide groove 17, the mobile gun arm 14 moves along the guide groove 17 as one body with the arm holder 13.

The motor drive unit 15 houses an encoder 27, in addition to a servo motor, lead screw mechanism, pressurized rod, etc. (not illustrated) inside of the unit housing 24 thereof.

The unit housing 24 is fixed to a lower end of both side plates 11a of the gun body 11.

The servo motor and pressurizing rod are connected so that the rotary operation of the servo motor converts into advancing/retracting operation (vertical operation) in the axial direction of the pressurizing rod via the lead screw mechanism.

A leading end of the pressurizing rod is installed to the lower-side guide pin 20 of the arm holder 13 via a knuckle (not illustrated).

The encoder 27 detects the rotation angle of the servo motor in order to precisely determine when the electrode tip 23 of the mobile gun arm 14 moves until what position relative to the electrode tip 18 of the fixed gun arm 12 that current will flow between both electrode tips 23, 18, and the timing thereof, and in order to control the movement of the mobile gun arm 14.

The transformer 16 is installed to an outer side of the motor drive unit 15. The transformer 16 flows welding current between the electrode tips 23, 18 when sandwiching a work (sheet material) by the electrode tip 23 of the mobile gun arm 14 and the electrode tip 18 of the fixed gun arm 12.

In the welding gun 10 configured in the above described way, the pressurizing rod moves vertically when the servo motor is driven, and the arm holder 13 moves vertically via the guide pin 20 to which the knuckle of the pressurizing rod is installed, whereby the mobile gun arm 14 opens and closes.

When the mobile gun arm 14 is closed, the work (sheet material) is sandwiched between the electrode tip 23 thereof and the electrode tip 18 of the fixed gun arm 12, and spot welding is performed.

Then, in the present embodiment, the gun body 11 of the welding gun 10 is entirely concealed by the protective cover 30.

The protective cover 30 includes a cover main body (protecting means) 31, first strings (mobile gun arm retaining means) 36a, 36b, and second strings 33 (fixed gun arm retaining means).

The cover main body 31 is a tubular shape with both ends open, and is mounted to cover the gun body 11 by inserting the mobile gun arm 14 in an opened state from the lower end opening part thereof (other end opening part). The cover main body 31 is created by overlapping two sheets (may be one sheet) of flame retardant fabric (raw material) made by unit knitting thread made from synthetic fiber such as Zylon (trade name), which can follow shape changes.

In addition, the cover main body 31 has a common section 31a in which the fiber is oriented in the cylinder axis direction to be expandable in the radial direction, and a special section 31b positioned between the mobile gun arm 14 and the fixed gun arm 12 in which fibers are oriented in the circumferential direction to be expandable in the cylinder axis direction. More specifically, the common section 31a and special section 31b are formed separately, and the special part 31b that is rectangular is similarly stitched using thread made of synthetic fiber such as Zylon (trade name) at the rim part of the rectangular hole notched in the common part 31a.

In addition, a first notched part 32 positioned at a front-side lower part, i.e. below the special section 31b and surrounding the fixed gun arm 12, and a pair of left and right second notched parts 34 positioned at a rear-side lower part and surrounding the pair of left and right side plates 11a of the gun body 11 are formed in the cover body 31.

The first strings 36a, 36b are flame retardant ropes made of synthetic fiber such as Zylon (trade name), and are respectively inserted into threading bag-like parts 37a, 37b formed over the semi-circumferential portions on the front side and rear side at the upper end opening (one end opening) of the cover main body 31. In addition, by joining both ends to each other, the first strings 36a, 36b become able to maintain a state allowing the mobile gun arm 14 to project and establishing the upper end opening of the cover main body 31 as a narrow mouth.

The second string 33 is a flame retardant rope made of synthetic fiber such as Zylon (trade name), and is inserted into a threading bag-like part 38 formed at a notch edge portion of the first notched part 32. In addition, by joining both ends, the second string 33 becomes able to maintain a state allowing the fixed gun arm 12 to project and establishing the lower end opening of the cover main body 31 as a narrow mouth.

Threading bag-like parts 39 are formed in each of the pair of left and right second notched parts 34, and third strings 35 are inserted into each of these threading bag-like parts 39. The pair of left and right third strings 35 is flame retardant ropes made of synthetic thread such as Zylon (trade name), and by joining both ends of each to each other, the pair of left and right second notched parts 34 surrounding the pair of left and right side plates 11*a* of the gun body 11 are tightened.

According to the present embodiment configured in this way, mounted to a guide-type welding gun 10 is a protective cover 30 that includes a tube-shaped cover main body 31 of flame retardant fabric which can follow shape changes through which the mobile gun arm 14 or fixed gun arm 12 passes, the first strings 36*a*, 36*b* that can allow the mobile gun arm 14 to project and maintain the upper end opening in a narrow-mouthed state, and the second string 33 that can allow the fixed gun arm 12 to project and maintain the lower end opening in a narrow-mouthed state.

According to this, at least the gun body 11 will be entirely concealed by the protective cover 30 having flexibility. Consequently, the welding slag, etc. generated during welding is prevented from penetrating inside the gun body 11 regardless of the opened/closed state of the mobile gun arm 14, and the internal mechanism of the gun body 11 can operate always keeping a clean state; therefore, the durability of the welding gun 10 is improved. In addition, in equipment equipped with a plurality of the welding guns 10 in a single robot, etc., even if a situation in which one welding gun 10 is mobile and another welding gun 10 opens the mobile gun arm 14 and rests, welding slag, etc. will not penetrate into the gun body 11 of this welding gun 10 that is resting.

In addition, since the special section 31*b* that can expand and contract to correspond to the opening/closing operations of the mobile gun arm 14 is provided in a portion positioned between the mobile gun arm 14 and fixed gun arm 12 of the cover main body 31, which differs from another portion of the common section 31*a*, it is possible to sufficiently handle the repeated opening/closing operations of the mobile gun arm 14, and extended service life of the protective cover 30 is achieved.

In addition, the cover main body 31 includes the first notched part 32 surrounding the fixed gun arm 12 and the pair of left and right second notched parts 34 surrounding the pair of left and right side plates 11*a* of the gun body 11; therefore, the gun body 11 is even further concealed without gaps by the cover main body 31, and penetrating of welding slag, etc. is more reliably prevented.

As a result thereof, welding slag, etc. generated during welding is reliably prevented from penetrating to the interior of the gun body 11, whereby it is possible to even further improve the durability of the welding gun 10.

It should be noted that the present invention is not to be limited to the above-mentioned embodiment, and that, needless to say, various modifications such as modifications to the material and shape of the cover main body and changes to the string material are possible within a scope not departing from the gist of the present invention.

EXPLANATION OF REFERENCE NUMERALS

10 welding gun
11 gun body
12 fixed gun arm
13 arm holder
14 mobile gun arm
18,23 electrode tip
30 protective cover
31 cover main body
31*a* common section
31*b* special section
32 first notched part
33 second string
34 second notched part
35 third string
36*a*, 36*b* first string

The invention claimed is:

1. A protective cover for use on a welding gun which includes a fixed gun arm that is fixed to a gun body, a mobile gun arm opposing the fixed gun arm, and a drive device provided at a side of the gun body, wherein the mobile gun arm is connected to an arm holder that is movable along a guide groove formed in a side of the gun body, and the mobile gun arm undergoes opening/closing operations via the arm holder by way of the drive device, the protective cover comprising:

a cover main body of a flame retardant fabric capable of following shape changes and having an open-ended tubular shape defining a cylinder axis and into which the mobile gun arm or the fixed gun arm is inserted, and at least covering the gun body;

a mobile gun arm retainer provided on the cover main body that retains the cover main body to the mobile gun arm that allows the mobile gun arm to project and maintain one end opening of the cover main body in an narrow-mouthed state; and a fixed gun arm retainer provided on the cover main body that retains the cover main body to the fixed gun arm that allows the fixed gun arm to project and maintain one other end opening of the cover main body in a narrow-mouthed state, wherein a special section that can expand and contract to correspond to the opening/closing operations of the mobile gun arm is provided in a portion of the cover main body positioned at least between the mobile gun arm and the fixed gun arm, which differs from a common section provided in another portion of the cover main body, the common section in which fibers are oriented in a cylinder axis direction to be expandable in a radial direction of the cylinder axis, and the special section in which fibers are oriented in a circumferential direction of the cover main body to be expandable in the cylinder axis direction.

2. The protective cover for a welding gun according to claim 1, wherein the cover main body comprises: a first notched part that surrounds the fixed gun arm, and a second notched part that surrounds a pair of left and right side plates of the gun body.

3. The protective cover for a welding gun according to claim 1, wherein the common section and special section are formed separately, and the special section is stitched using thread made of synthetic fiber at a rim part of a hole notched in the common section.

4. The protective cover for a welding gun according to claim 3, wherein the cover main body comprises: a first notched part that surrounds the fixed gun arm, and a second notched part that surrounds a pair of left and right side plates of the gun body.

\* \* \* \* \*